Oct. 23, 1956    J. W. ANDERSON    2,767,733
CONTROL VALVE OPERATED BY PRESSURE DIFFERENTIAL
Filed Dec. 26, 1951    2 Sheets-Sheet 1
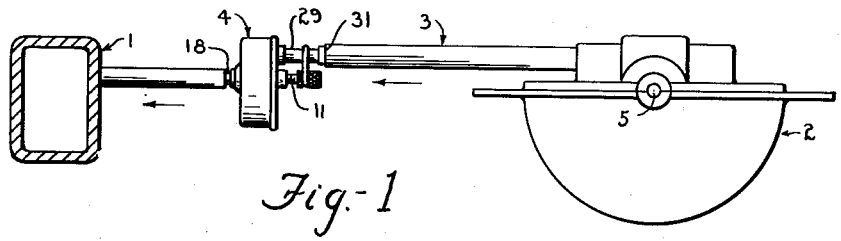
Fig.-1
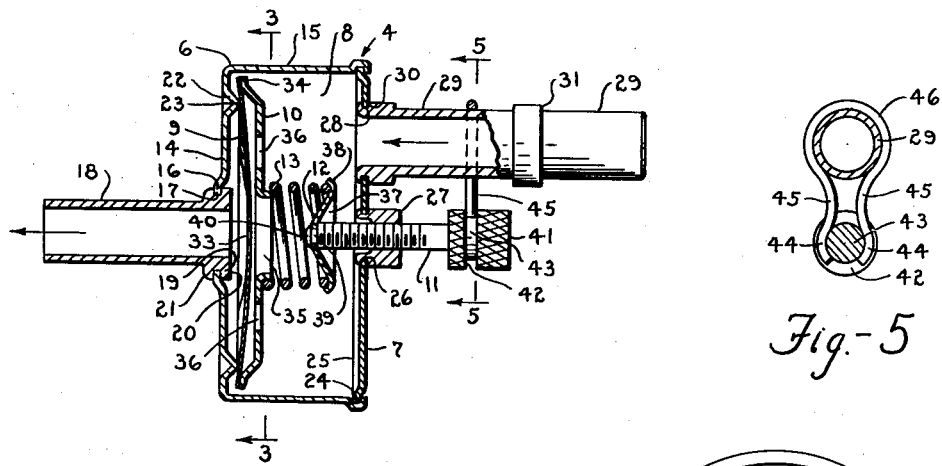
Fig.-2
Fig.-5
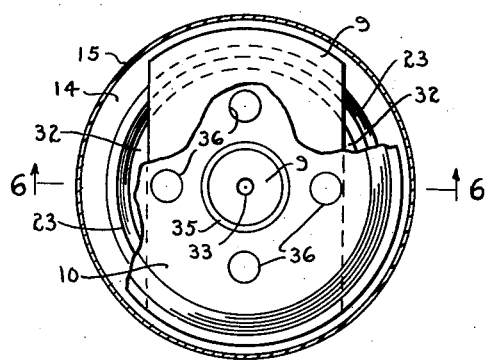
Fig.-3
Fig.-4
INVENTOR.
JOHN W. ANDERSON
BY
Charles S. Perfold
ATTORNEY INVENTOR.
JOHN W. ANDERSON
BY
Charles S. Penfold
ATTORNEY

United States Patent Office 2,767,733
Patented Oct. 23, 1956

2,767,733

CONTROL VALVE OPERATED BY PRESSURE DIFFERENTIAL

John W. Anderson, Gary, Ind., assignor to Productive Inventions, Inc., a corporation of Indiana Application December 26, 1951, Serial No. 263,251

12 Claims. (Cl. 137—497)

This invention relates generally to fluid control means and more particularly is directed to a valve device for regulating the flow of fluid in a line or conduit of a fluid operated system.

A broad object of this invention is to provide method and valve means by which work to be performed by fluid pressure can be held automatically within desirable limits with relation to actual power employed, automatic compensation being provided for irregularities in the intensity of power at the source.

A further purpose is to provide method and valve means by which variations in the flow of a fluid through a conduit may be minimized regardless of the source-pressure inducing the flow.

A particular object of the invention is to provide automatic method and means by which undesirable variations in the speed of operation of a fluid-type windshield wiper motor may be minimized.

While it will be obvious that the method and means employed has many uses not related to windshield wipers, there is here presented a device by which the invention may be practiced successfully in relation to automatic windshield wipers of the fluid type—particularly the vacuum type.

Every observant driver of any one of the approximately forty million motor vehicles now in use, and equipped with vacuum windshield wiper motors, is annoyed and endangered in traffic in stormy weather by two performance characteristics of his vacuum windshield wiper motor—two characteristics common to all vacuum windshield wiper motors.

In ordinary driving the vacuum value varies from substantially less than eight inches of mercury to substantially more than twenty inches. When the foot is removed abruptly from the accelerator, with the motor running at normal cruising speeds, the vacuum shoots up to abnormally high values. Whenever the accelerator is depressed suddenly, the vacuum drops to abnormally low values.

Each vacuum motor is provided with a hand throttle for manual operation. The driver may adjust the throttle to restrict the intake of the wiper motor sufficiently to prevent abnormal racing of the motor a abnormally high vacuum values. However, if he does so, upon depressing his accelerator (to open the throttle of the automobile engine) as the vacuum value drops the wiper motor, with its intake arbitrarily restricted, tends to slow down abnormally for want of adequate access of air, and, at a point of vacuum determined by motor loading, including internal friction, the motor stalls.

Thus the driver must choose between two evil performance characteristics, one of which confuses and annoys and the other of which reduces the speed and effectiveness of his windshield wiping apparatus, often during the most critical and dangerous conditions encountered in driving.

As a partial remedy for the tendency of the wiper motor to slow down, various types of auxiliary-booster methods and mechanisms have been presented, but their cost to the car owner has been such as to have restricted their use. No such booster apparatus affords any relief from the racing of the vacuum wiper motor occasioned by high vacuum.

This racing is undesirable, not only from the standpoint of its annoyance to the driver. Racing of the wiper motor subjects the motor and the wiper arm and the blade to excessive shock and strain as the wiper stroke is reversed. This excessive strain tends to cause distortions and breakdowns of connections between members. Racing also tends to force the wiper blade and arm to overreach at the end of the stroke and to slap the windshield frame. This slapping is annoying to the driver and is destructive to wiper mechanisms, as well as to car finish.

Much of the trend toward electric wiper motors, which usually are substantially more costly than vacuum wiper motors in the same power category, has been due to the above-discussed performance deficiencies and irregularities common to all vacuum motors.

Electric wiper motors not only are more costly than vacuum motors, but they require substantial quantities of copper in their production. Shortages of copper are particularly acute in periods of high production for military uses. When electric wiper motors are used it adds to the total load of the electrical apparatus of the automobile, and provision must be made for carrying that load. Such expansion of magneto and battery capacities also adds to the cost of the vehicle.

The above-discussed deficiencies of the vacuum-type windshield wiper motor have been well impressed upon all car manufacturers, car resellers, and car owners, since the advent of the vacuum wiper more than thirty years ago. Many efforts have been made to eliminate these undesirable characteristics—without eliminating the vacuum motor. Vacuum motor manufacturers, as well as car manufacturers, engineers, and all manner of "crossroads" mechanics have endeavored to determine upon a satisfactory solution of the problem. Prior to the subject invention, none had been discovered within applicant's knowledge.

It of course has been desirable to permit the operation of vacuum wiper motors with wide-open throttles, as a means of minimizing the drop in speed while approaching the point at which the wiper motor stalls under low vacuum. It has been desirable that this unrestricted flow through the vacuum motor to the engine intake be maintained up to the point where there occurs an increase in vacuum values sufficient to cause the motor to race undesirably.

One problem has been to maintain such unobstructed flow to the point where racing would begin and then introduce a control to produce thereafter substantially a "straight line" performance (as to the speed of the wiper motor) throughout the entire range of excess vacuum values.

Accordingly, one important object of the invention is to provide a valve device, embodying improved principles of design and construction, which overcomes all of the disadvantages inherent in prior devices attempting to solve the problem above referred to.

A significant object of the invention is to provide a valve device with a novel valve or control element and a manual adjustment thereof so that the volume of fluid passing through the device can be predetermined or regulated.

Another object of the invention is to provide a valve device which is comparatively small in size and relatively light in weight so that it can be readily interposed in a conduit or line for sole support thereby.

Another object of the invention is to provide a compact valve device composed of a minimum number of components or members which can be economically manufactured and readily assembled on a production basis.

A further object of the invention is to provide a valve device which is durable, efficient and particularly sensitive to small variations in pressure.

Other objects and advantages of the invention will become apparent after the description hereinafter set forth is considered in conjunction with the drawings annexed hereto.

In the drawing wherein the parts or members are designated by the same numerals:

Figure 1 is a side view in elevation exemplifying the valve device interposed and supported in a line or conduit communicatively connecting a source of vacuum supply with a windshield wiper motor;

Figure 2 is an enlarged longitudinal section taken through the device illustrating details of its construction, including a manual adjustment for the control or valve element;

Figure 3 is a transverse section taken substantially on line 3—3 of Figure 2, with a portion of one of the members broken away to illustrate additional details;

Figure 4 is one end view of the device;

Figure 5 is a transverse section taken substantially on line 5—5 of Figure 2 depicting means employed for locking in place the manual adjustment for the control or valve element, said means also being shown in Figures 1, 2 and 4;

Figure 6:
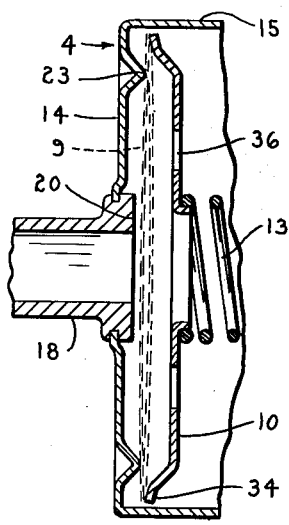
Figure 6 is an enlarged partial sectional view of the device taken substantially on line 6—6 of Figure 3.

Referring to the drawing, numeral 1 denotes a conventional source of vacuum, 2 a windshield wiper motor communicatively connected to the source by a conduit, hose, or line 3, and 4 is the valve device embodying the structure of the invention interposed in the line 3 for accomplishing the objects above set forth.

The motor 2 may be of the conventional type having, among other things, an oscillatable vane which is operated by fluid pressure to actuate a drive shaft 5. A wiper arm and blade assembly is adapted to be carried by the shaft.

The valve device includes a cup member 6 and a round cover 7 which are secured together to provide a housing forming a cylindrical chamber 8. Within the chamber there is arranged a mechanism comprising a valve element or control member 9, a pressure member 10, a manual adjustment in the form of a screw 11, a retainer 12 carried by the screw, and a helical spring 13 interposed between the pressure member and retainer for forcing the pressure member and valve element in one direction and the retainer in an opposite direction, all of which will be described in detail subsequently.

More particularly, the cup 6 includes a radial base wall 14 and an axially extending round side wall 15. The base wall 14 is provided with a centrally disposed depression 16 having an opening 17 therein. A cylindrical tubular extension 18 is permanently connected to the base wall. The inner end of the extension is provided with a radial flange 19 having a flat bearing surface forming a valve seat 20. The extension is preferably connected to the base wall by inserting the extension through the opening 17 so that the flange 19 is seated in the depression 16 and then upsetting a shoulder 21 on the extension against the exterior surface of the depression to form a fluid type joint between the extension and wall. The arrangement is preferably such that the bearing surface or seat 20 is disposed inwardly from and in parallel relation to the inner surface of the base wall. The base wall is further provided with an inwardly extending annular fulcrum or pivot 22 concentrically arranged with respect to the side wall 15 of the housing and the depression 16. It will be noted that the fulcrum is preferably formed by depressing the base wall to form a corrugation substantially V-shaped in cross-section to provide a rest 23, which is located closer to the side wall 15 than to the periphery of the flange 19. It should be noted that the corrugation also serves to reinforce or lend stability to the base wall so as to prevent any possibility of distortion or flexation of the wall when the valve device is in operation.

It should be understood that if found desirable, the base wall could be extruded to form a unitary tubular extension for attachment to a conduit. As will be pointed out more in detail hereinafter, the outer end of the extension 18 is adapted to be received and secured within one end of a section of the conduit 3.

The cover is preferably made flat and provided with a peripheral offset flange 24. This cover may be secured to the housing in any manner desired but is preferably permanently secured thereto by placing the flange 24 against a radial shoulder 25 formed on the side wall 15 of the cup and then upsetting the marginal edge portion of the wall against the flange 24 to provide a fluid tight joint between the cover and cup.

The cover is also provided with a central aperture 26 within which a bearing 27 is secured. The cover is further provided with an opening 28 located between the aperture 26 and the flange 24. A cylindrical tubular extension 29, similar to extension 18, is preferably secured in the opening 28 by upsetting the inner end of the extension against the inner surface of the cover to force the cover against a shoulder 30 formed on the extension so as to provide a permanent fluid tight joint between the extension and cover. The bearing 27 is preferably secured in the aperture 26 in the same manner as the extension 29 is secured in the opening 28. The bearing 27 is provided with an axial threaded aperture which receives the screw 11.

It will be noted that the tubular extension 29 is of a length somewhat greater than the length of the tubular extension 18, and that the extensions form longitudinal passages which are arranged in parallel relation. The extension 29 is preferably provided with a shoulder 31 so as to provide a stop for the end of a section of the conduit or hose line 3 which is adapted to be snugly fitted over the outer end of the extension as shown in Figure 1. The manner of connecting the extensions to the hose or conduit will be described in detail subsequently.

The valve mechanism will now be described in detail. The valve element or control member 9 constituting a component of the mechanism may be constructed as desired but as herein illustrated is made oblong or generally regular in shape, relatively thin and normally flat. The element may be constructed from any material which is sufficiently sensitive for the purpose but beryllium copper gauged to a predetermined degree of flexibility or yieldability has proven satisfactory in commercial use. It will be noted that the valve element is of a length greater than the distance between diametrically opposed potrions of the rest 23 so that end portions of the element will project outwardly beyond the said opposed portions as clearly shown in Figures 2, 6 and 7 of the drawing. In other words, the arrangement is preferably such that end portions of the valve element will overhang the rest 23 regardless of the rotative position of the valve element on the rest. Otherwise expressed, portions of the valve element are arranged on either side of a portion of the rest. The ends of the valve element are preferably rounded so as to conform generally to the curvature of the pressure member 10 and side wall 15 of the cup. Attention is directed to the fact that the width of the valve element is somewhat less than the diameter of the rest 23 so as to provide an opening or passage 32 of generally segmental form adjacent each side of the valve element through which fluid can freely circulate about the pressure member 10, as shown in Figure 3.

Attention is directed to the important fact that the circular form of the valve rest 23 provides a revolutionary construction and performance in that the valve element assumes, under pressures of the concentric raised portion of the pressure member 10 a position roughly describable as in the path of a curved line. In other words, the curvature of the valve element is in part in a lateral direction and in part in a longitudinal direction.

Such compound curvature provides for the valve element added capacity for resisting accumulating pressures developed by the flow of fluid through the system. The valve element maintains this resistance until a predetermined point of pressure has been reached. This point of pressure can be varied by an adjustment of manual screw 11 of the pressure of the coil spring 13 upon the pressure plate 10.

In order to avoid the necessity for dealing with the full values of the fluid flow above a critical pressure point a vent such as 33 of predetermined size may be provided in the valve element, preferably concentric with the passage in the extension 18. This vent serves also the purpose of preventing at extremely high vacuum values, the substantial sealing of the vent through the passage. In other words, the provision of this vent makes it possible to use a lighter and more responsive construction than would be required were the vent omitted and the full force of extreme vacuum pressures applied to the surface of the valve element.

Figure 7:
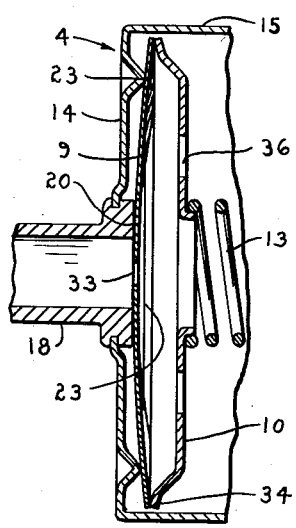
Figure 7 is an enlarged partial longitudinal section, similar to Figure 6 showing an operative position of the valve mechanism.

The pressure member 10 of the mechanism is preferably made in the form of a dished disc, having an annular offset flange 34. The diameter of the pressure member is somewhat greater than the diameter of the rest 23 and substantially corresponds to the length of the flexible valve element 9 so that the flange 34 will bear against the overhanging end portions of the valve element and distribute the pressure exerted by the spring. The pressure member 10 is also provided with a centrally disposed tubular portion 35 which extends in an axial direction toward the screw 11 and is received in one end of the helical spring 13. The dished or concave character of the member 10 not only imparts rigidity to the member to prevent distortion thereof but provides an arrangement whereby the flange 34 is the only part of the member which engages the valve element and at the same time affords clearance for movement of the element toward the screw 11 as shown in Figures 2, 6 and 7. The pressure member 10 is further preferably provided with a plurality of holes 36, four in number, arranged ninety degrees apart circumferentially about the tubular portion 35. The purpose of these holes is to allow fluid to freely circulate through the member. Some fluid may also circulate through the spring and tubular portion 35.

The spring retainer 12 may be made as desired but is preferably generally conical in shape and includes a cylindrical portion 37 and a flange 38. The opposite end of the helical spring 13 receives the cylindrical portion 37 and bears against the flange 38 to exert pressure in an axial direction to force member 10 against the valve element. The inner end of the screw is provided with a reduced portion 39 which is secured in a central aperture in the retainer by upsetting the end of the reduced portion as indicated at 40 in Figure 2 so that the retainer is loosely secured to the screw to permit the retainer to readily adjust itself with respect to the spring. With this arrangement, the spring 13 under tension serves to distribute and equalize the pressure of the pressure member against the overhanging end portions of the valve element and the pressure of valve element against the rest 23. The screw 11 is preferably provided with a knurled head 41 for manipulating the screw so that the force of the spring may be increased or decreased to meet various operating conditions. As shown in Figure 2 the spring pressure is such that the valve element is maintained in a slightly tensioned condition relative to the bearing surface or valve seat 20 on the flange 19.

Any means suitable for the purpose may be employed to lock the screw in place after it has once been adjusted. However, as herein illustrated, the locking is preferably accomplished by providing the knurled head 41 with a circumferential groove 42 to form a neck 43 so that the corresponding curved end portions 44 of the legs 45 of a hairpinlike wire clip will be received in the groove and resiliently embrace the neck as clearly illustrated in Figures 2 and 5. The clip is held in position by the groove and its substantially round bight end 46 resiliently embraces the longer tubular extension 29 as clearly shown. With this arrangement it will be obvious that the clip is prevented from turning about the extension and that its resilient legs affords sufficient clamping pressure against the neck 43 to automatically maintain the screw 11 in any position to which it may be adjusted.

In view of the foregoing description, it will be noted that substantially all of the parts employed are concentric—thus contributing to balance and accuracy in performance. Also, that, with the exception of the tubular members, the screws, and the springs, all of the parts can be produced readily on automatic or semi-automatic punchpresses—thus providing maximum economy in production.

Simplicity of installation is made possible by the small weight of the device—which in turn is made possible by the herein-described features which contribute to sensitivity in response to varying flows or pressures. The device requires no support other than that provided by the conduit or hose 3. It is only necessary to sever, at any convenient point, the rubber hose leading from the intake or vacuum source of the automobile engine to the vacuum wiper motor. The two extensions 18 and 29 are then pressed into the hose, forming a connection amply secured by friction. The extension 18 is inserted in that portion of the severed hose which leads to the intake of the automobile engine and the other and longer extension 29 is inserted in the remaining section of the hose so that the flow of air through the device is from the vacuum wiper motor to the automobile engine, as the vacuum is developed by the operation of the automobile engine.

The valve device, in production at the factory, is readily set to provide a snap-over or breaking point on the part of the control member satisfactory for use on all vacuum windshield wiper motors within a predetermined size or power category. Two models, differing only in the diameter of the vent hole 33, at present provide complete service coverage for all vacuum wiper motors now in use. It is seldom necessary for the car owner to make any change in this adjustment. If he desires he may do so readily by the use of the manual screw 11, by which greater or less pressure may be applied to the control member through the pressure plate as mentioned above. Thus individual preferences as to windshield wiper motor speeds may be accommodated quite readily. Once set, the device does not change its adjustment or its performance appreciably but remains substantially stable. These devices are set at the factory usually to cause the valve element to snap over at about twelve to fifteen inches of vacuum.

In view of the foregoing it will be manifest that when the device is installed as in Figure 1 and the various components of the device are set as illustrated in Figure 2, a predetermined volume of fluid can circulate through the device in accordance with a predetermined pressure, without substantially altering the relative position of valve element 9. As the pressure or vacuum increases, the snap-over point is reached and the valve element 9 tends thereafter to vary its position in accordance with variations in such pressures as is shown by example by the dotted lines in Figure 6. These variations in position may occur at any point within the operating range of the movement of the valve element. As the vacuum increases, the pressure differential between the bottom of the valve element and the top increases so that the valve element is pressed closer to the valve seat 20. In normal operation the variations in the position of the valve element 9 (as occurring after the snap-over) cover a range limited at one extreme at a point somewhat less than a complete sealing of the valve element 9 against the valve seat 20 and the position of the valve element shown in Figure 2. It is obvious that, with due allowance for frictional lag, valve element 9 will reset itself in the position shown in Figure 2 at the time the vacuum declines to the value predetermined by the setting of the screw 11.

The valve element 9, being fulcrumed on a circular rest 23 and receiving its pressures from a circular pressure member 10, forms itself, in the vacuum range below the predetermined setting, into a dished shape, which dished shape may be somewhat irregular. This dished shape, plus slidable frictional resistance at points of contact between the valve element 9 and the rest 23 and pressure member 10, established a reluctance which fixes, along with the dishing of the valving element, a vacuum value which, within substantially narrow ranges, must be created to overcome the static of the frictional resistance and the dishing of the valve element to produce the snap-over.

Furthermore, once this valve element snaps, at a predetermined point of pressure, to its reversed lower position, it provides a restriction of the passage of air into the extension 18 and to the vacuum supply or intake manifold of the automobile engine. From this point on, the valve element, in its reversed position, responds to variations in fluid pressures so that as the pressure increases the distance between the valve element and the extension becomes shorter and the flow is correspondingly restricted—the result being that the actual volume of flow of air through the windshield wiper motor is held substantially constant so that the speed of the motor is held also substantially constant regardless of any change in vacuum values above the predetermined critical point at which the valve element snaps over to said reverse position.

Figure 8:
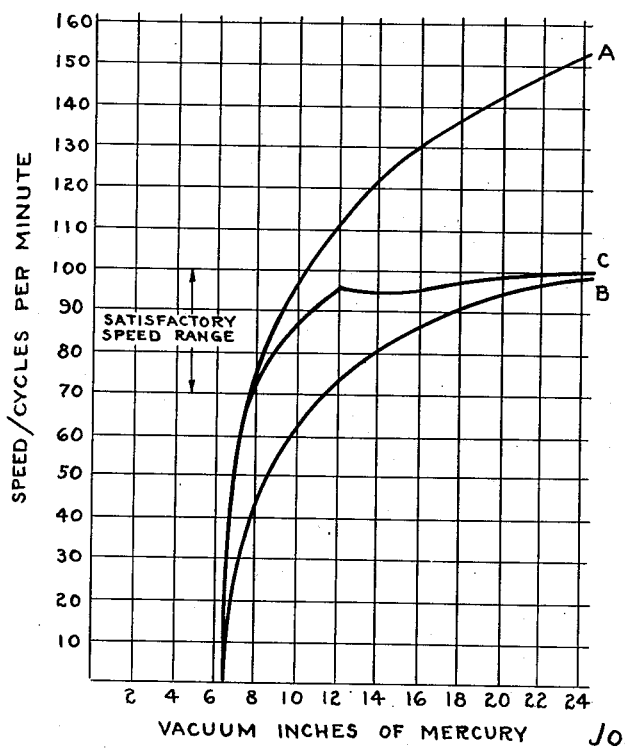
Figure 8 illustrates a performance chart showing various operative conditions which obtain with and without utilizing the invention.

Figure 8 shows a performance chart taken on August 30, 1951, with a standard type vacuum windshield wiper motor. Curve A shows vertically the cycles performed by the windshield wiper blade at varying vacuum pressures shown horizontally—with the throttle of the vacuum wiper motor wide open at all times. The chart shows by this curve A that speeds become excessive at vacuum value of ten inches and becomes destructive at a vacuum value of twenty-four inches.

Curve B shows performance with the throttle of the same vacuum wiper motor, operating under the same condition, restricted to minimize top speed and bring it within tolerable ranges. The throttle of the wiper motor was not changed during the production of either curve A or curve B. In producing curve A that throttle was wide open. In producing curve B it was partially closed to limit top speed. In the production of curve A and curve B the vacuum conduits were conventional and there was no introduction of the subject invention.

Curve C shows the performance of the same wiper motor, operating under the same conditions, with the subject invention introduced as herein contemplated, with the vacuum wiper motor operating at all times with its throttle wide open, as in the production of curve A, and with screw 11 adjusted to cause the snap-over of valve element 9 at approximately twelve inches of vacuum. Curve C shows performance under these described conditions as compared with performance under the conditions described to produce curves A and B, respectively.

It will be noted that, due to the minimizing of restrictions to the flow of air with valve member 9 in the position shown in Figure 2, performance follows curve A substantially exactly until the wiper blade speed closely approaches seventy cycles. At this point the static friction of the contacts above described begins to yield and the resistance of the dished valve member begins to yield. At a wiper blade speed of approximately 96 cycles the snap-over occurs and the substantially unrestricted regulatory function of valve element 9 comes into play as shown in Figure 6. It will be noted that this regulation holds the speed close to straight-line performance, even up to an abnormal vacuum pressure of twenty-four inches.

It will be noted that the invention, as shown in curve C, has performed successfully its intended function of preventing wiper blade speeds beyond a satisfactory speed range. It will also be noted that between the point of slightly more than six inches of vacuum at which the internal friction of the motor and the friction of the load combined causes, under all conditions, a stalling of the motor, and the point of performance at twenty-four inches of vacuum, there lies between curve B and curve C a very substantial area which measures a plusage of actual performance of the wiper motor gained through the use of the subject invention. This invention has prevented excessive wiper blade speeds and, in addition, has provided substantially more wiping performance, particularly desirable, from the stall point of vacuum to the snap-over vacuum value of twelve inches.

The opening 32 in the valve element 9 is of a size to permit, under conditions where the valve element substantially prevents the flow of fluid between the valve element 9 and seat 20, sufficient flow of fluid to maintain motor performance within practicable limits of speed when the vacuum value is excessively high. Such excessive value frequently occurs substantially instantaneously when the foot throttle or accelerator of the automobile engine is lifted abruptly so as to create a sudden closing of the automobile engine throttle so that the automobile engine intake is restricted suddenly, with the result that the engine, still operating at relatively high speed, produces an abnormally high vacuum in the intake. One condition under which this abnormal condition endures longest is when the automobile is traveling downgrade.

In any conventional device for regulating flow of fluid the regulatory function of the device begins at zero pressure and effects a retarding action from zero pressure to the maximum pressures encountered. Thus the curve produced shows consistent increment from zero pressure to and through the normal operating range. The application of such conventional flow regulator to conditions where the working apparatus to be regulated reaches a point of stall (as the value of the flow pressure declines) produces a result deficient to the extent of the gain in performance attained through the application of subject invention, as herein described.

Thus the presence, as an element of the subject invention, of the combination of the curved fulcrum and curved pressure plate and of the dishing of the valve element 9 introduces a performance function of high utility not attained in any known device for similar purposes.

This novel combination and function, as explained herein, makes an important contribution to windshield wiper performance and thereby to the reduction of driving hazards through improved driving vision.

Although the preferred form of the invention has been shown and described in detail, it will be apparent to those skilled to the art that the invention is not limited to the enclosed disclosure, but that various changes can be made therein without departing from the spirit of the invention or from the scope of the invention defined in the appended claims.

I claim:

1. A fluid control valve device comprising a housing having a base wall and an opposed end wall, an opening in the base wall, a valve seat carried by the base wall and located about the opening, rest means supported on the base wall and surrounding the opening, a flexible valve element directly supported on the rest means to position the element off the seat so that the fluid can circulate between the element and the seat into the opening, a hole in the element, spring pressed means maintaining the element against the rest means, an aperture in the end wall of the housing, the arrangement being such that when the pressure of the fluid obtaining in the valve reaches a predetermined value, the element will flex and engage the seat so that fluid will flow only through the hole in the element.

2. A fluid control valve comprising a housing having opposed walls, a valve seat connected to one of the walls and provided with an opening, a flexible valve element arranged in the housing, a rest supporting the element off the seat, a pressure member, holes in the member through which fluid may circulate, adjustable spring means pressing the member against the element and the latter against the supporting means, said element and said rest being constructed and arranged whereby fluid may circulate through the holes and between the rest and element and into the opening when the fluid pressure obtaining in the valve is low and when the pressure is high the element will be caused to flex and engage the seat to prevent such circulation of fluid into the opening, and an aperture provided in the other of the opposing walls of the housing.

3. A fluid control regulating valve comprising a walled chamber, a rest on one wall of the chamber, a passage in said one wall, a valve seat adjacent said passage, a flexible valve element engaging the rest at spaced locations to position the valve for flexing relative to the seat in response to fluid pressure, a relatively small aperture provided in the valve element to permit flow of fluid through the valve element toward the passage, a pressure plate and resilient pressure means pressing the pressure plate against the valve element, and a pasage provided in another chamber wall, the arrangement being such that the fluid pressure within the chamber is regulated by the valve element and the resilient pressure means.

4. A fluid control valve having a cylindrical chamber and being provided with parallel tubular extensions communicatively connected with the chamber, abutment means and a valve seat disposed in the chamber, a thin flexible valve element, an aperture provided in the element, said element being arranged in the chamber and engaging the abutment at only substantially diametrically disposed locations to locate the element in a spaced position with respect to the seat so that fluid may circulate about the element and through the aperture from one tubular extension to the other tubular extension through the valve chamber when the flow of fluid is in one direction toward the valve seat, and said element being so constructed and arranged that when the flow of fluid is reversed, the element will be caused to automatically flex against the seat so that the fluid will pass only through the aperture to reduce the flow of fluid.

5. A fluid control valve comprising a cylindrical housing having substantially parallel end walls, holes provided in the end walls for communication with a conduit, a valve seat provided adjacent the hole in one of the end walls, an annular rest arranged about the seat and spaced axially therefrom, an elongated flexible valve element of a length greater than the diameter of the rest so that the ends of the element will extend outwardly from the rest, a round pressure distributing member, said distributing member having a peripherial portion of a diameter greater than that of the rest, a spring exerting axial pressure on the central area of the distributing member to cause the peripherial portion to act on the ends of the element to force the element against the rest at substantially diametrically disposed locations, said element being of a width less than the diameter of the rest to provide a pair of openings substantially segmental in shape through which fluid may circuate, and an aperture provided in the center of the element through which fluid may circulate, the arrangement being such that an increase in fluid pressure in the hole in the other end wall will cause the element to move toward the seat and restrict in some measure the flow of fluid through the openings while allowing the fluid to freely pass through the aperture, and an excessive increase in pressure will cause the element to engage the seat and stop the flow of fluid through the openings while allowing the fluid to pass without interruption through the said aperture.

6. A valve device comprising a housing having a base wall and an opposed end wall, a first tubular extension connected to and extending outwardly from the center of the base wall, the inner end of the extension forming a valve seat, an annular rest formed in the base wall, a generally rectangular flexible valve element, and a pressure member arranged in the housing, a screw threadably connected to the center of the end wall of the housing, a spring having one end supported on the inner end of the screw and its other end engaging the pressure member to press the pressure member and element in one direction, the force applied between the pressure member and element being applied in spaced relation to the locations where the force between the element and rest is applied so that by manipulating the screw the tension of the spring can be adjusted to set the element in any one of an infinite number of operating positions, a second tubular extension connected to and extending outwardly from the opposed end wall of the housing in a position substantially parallel to the first extension, and means carried by said second extension and engaging the screw for locking the screw in any rotative position desired.

7. A fluid control valve comprising a housing having a side wall and opposed end walls and forming a chamber, tubular fittings extending from the end walls and communicatively connected with the chamber, one of said fittings being formed to provide a valve seat, annular abutment means integral with one of the end walls and extending into the chamber between the side wall and the seat, and an elongated resiliently flexible one-piece valve element bodily displaceable in the chamber and having its ends engaging the abutment means to locate the element in spaced relation to the seat, the arrangement being such that the element will flex intermediate its ends relative to the valve seat in accordance with variations in pressure obtaining in the valve to control the flow of fluid to and through said one fitting as it leaves the chamber.

8. A fluid control valve comprising a housing forming a chamber and having opposed end walls provided with openings, abutment means integral with one of the end walls and having portions extending into the chamber on opposite sides of one of the openings, and an oblong flexible valve element having its extremities engaging the abutment means, said valve element being bodily displaceable in the chamber and so formed that when the fluid pressure obtaining in the valve is below a predetermined value fluid can freely flow through the chamber and said one opening and when the pressure is below a predetermined value, the element will yield toward said one opening and restrict the flow of fluid therethrough as it leaves the chamber.

9. A fluid control valve comprising a housing forming a chamber and having opposed end walls provided with openings, abutment means located on opposite sides of one of the openings and projecting inwardly beyond said one opening, an apertured snap acting flexible valve element disposed in the chamber, biasing means pressing the element against the abutment means, said element being so formed that when the fluid pressure obtaining in the valve is below a predetermined value fluid can freely flow through the chamber and said one opening and when the pressure is below a predetermined value, the element will snap and restrict the flow of fluid to and through said one opening as it leaves the chamber, and means for adjusting the biasing means located substantially in axial alignment with one of the openings.

10. In a fluid control valve, a housing enclosing a chamber and provided with tubular extensions communicating with the chamber and providing means whereby the valve may be communicatively connected with and supported by a conduit, a valve seat interposed between said extensions, a flexible valve element in the chamber engageable with the valve seat, rest means in the chamber disposed in spaced relation to the seat, said element being automatically flexed in accordance with an increase in fluid pressure towards the valve seat, and resilient pressure distributing means operably contacting said element in spaced relation to said seat and operable independently of fluid pressure to urge a portion of said element intermediate the distributing means and the seat against the rest means, the spaced contact of said distributing means and said rest means with said element serving to prevent the element from engaging the seat when the pressure of the fluid entering the valve falls below a predetermined value.

11. A fluid control mechanism comprising a housing having a fluid flow opening, a valve seat in the housing, resiliently deflectible means engageable with the valve seat to control fluid flow through said opening and movable into engagement with the valve seat by such fluid flow, an abutment in said housing, and biasing means contacting said resiliently deflectible means to urge the same against the abutment, the abutment being interposed between the point of contact of the biasing means with the resiliently deflectible means and said valve seat, so that said abutment serves as a fulcrum on which the biasing means urges the resiliently deflectible means from said valve seat.

12. A fluid control valve comprising a housing having ingress and egress openings, a valve seat in the housing interposed between the openings and having an aperture, a flexible valve element arranged in the housing and having an aperture, a rest supporting the element off the seat, a pressure member having holes through which fluid may circulate, adjustable spring means pressing the member against the element and the latter against the rest, said element and said rest being constructed and arranged whereby fluid may circulate through the holes and between the rest and element and into the valve seat aperture when the fluid pressure obtaining in the valve is low and when the pressure is high the element will be caused to flex and engage the seat to restrict circulation of fluid into the valve seat aperture through the valve element aperture.

References Cited in the file of this patent

UNITED STATES PATENTS

| | | |
|---|---|---|
| 213,118 | Locke | Mar. 11, 1879 |
| 1,201,492 | Newton | Oct. 17, 1916 |
| 1,658,547 | Aseltine | Feb. 7, 1928 |
| 1,661,148 | Winkler | Feb. 28, 1928 |
| 1,673,470 | Puffer | June 12, 1928 |
| 1,688,185 | Hazard | Oct. 16, 1928 |
| 1,733,542 | Koehn | Oct. 29, 1929 |
| 1,780,121 | Dunning | Oct. 28, 1930 |
| 1,897,155 | Vaughn | Feb. 14, 1933 |
| 1,927,669 | Morrow | Sept. 19, 1933 |
| 1,998,761 | Heuber et al. | Apr. 23, 1935 |
| 2,057,624 | Burkhart | Oct. 13, 1936 |
| 2,187,768 | Arquint et al. | Jan. 23, 1940 |
| 2,217,419 | Saul | Oct. 8, 1940 |
| 2,219,408 | Benz | Oct. 29, 1940 |
| 2,291,881 | Coffey | Aug. 4, 1942 |
| 2,585,863 | Smith | Feb. 12, 1952 |
| 2,625,437 | Huntington | Jan. 13, 1953 |

FOREIGN PATENTS

| | | |
|---|---|---|
| 42,696 | Germany | Mar. 10, 1888 |
| 955,928 | France | July 4, 1949 |